(12) United States Patent
Yarkosky et al.

(10) Patent No.: US 9,066,214 B1
(45) Date of Patent: Jun. 23, 2015

(54) SYSTEM AND METHOD FOR SCALABLE BANDWIDTH ALLOCATION IN A WIRELESS WIDE AREA NETWORK

(75) Inventors: Mark Yarkosky, Overland Park, KS (US); Chris Seagren, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2170 days.

(21) Appl. No.: 11/126,574

(22) Filed: May 11, 2005

(51) Int. Cl.
  *H04W 72/00* (2009.01)
  *H04W 4/16* (2009.01)

(52) U.S. Cl.
  CPC ....................... *H04W 4/16* (2013.01)

(58) Field of Classification Search
  USPC .................. 455/450, 451, 452.1, 452.2, 453; 370/395.41, 329–341, 431, 468
  See application file for complete search history.

(56) References Cited

U.S. PATENT DOCUMENTS

| | | | | |
|---|---|---|---|---|
| 5,668,836 | A * | 9/1997 | Smith et al. | 375/316 |
| 6,088,335 | A * | 7/2000 | I et al. | 370/252 |
| 6,418,148 | B1 * | 7/2002 | Kumar et al. | 370/468 |
| 6,738,350 | B1 * | 5/2004 | Gao et al. | 370/232 |
| 2002/0064145 | A1 * | 5/2002 | Khare et al. | 370/342 |
| 2004/0192323 | A1 * | 9/2004 | Valenzuela | 455/452.2 |
| 2006/0013182 | A1 * | 1/2006 | Balasubramanian et al. | 370/343 |
| 2006/0045001 | A1 * | 3/2006 | Jalali | 370/208 |

* cited by examiner

Primary Examiner — Marcos Batista (57) ABSTRACT

An access point for a wireless wide area network can allocate two or more fundamental channels among wireless devices. In various implementations, the fundamental traffic channels may be for use with incompatible versions of the same air interface protocol (e.g., the 1xRTT and EV-DO versions of code division multiple access ("CDMA")). The access point may additionally have a reserved bandwidth that it can dynamically allocate to wireless devices to supplement the bandwidth allocated to them on the fundamental channels. For example, when sending or receiving large bursts of data, the access point can allocate additional bandwidth to the wireless devices, and after transmission of the large bursts of data, the access point can release the additionally allocated bandwidth.

19 Claims, 7 Drawing Sheets

SYSTEM AND METHOD FOR SCALABLE BANDWIDTH ALLOCATION IN A WIRELESS WIDE AREA NETWORK

FIELD OF THE INVENTION

This invention relates generally to wireless wide area networks. More specifically, it relates to systems and methods for scalable bandwidth allocation in wireless wide area networks.

BACKGROUND OF THE INVENTION

Wireless devices can access a wireless wide area network ("WWAN") for voice or data services. Depending on the type of WWAN, various different types of air interface protocols might be used for communication between wireless devices and an access point for the WWAN. The air interface protocols typically define methods for sending physical signals over the air interface, frequency ranges for communication between wireless devices and the access point, control information exchanged between wireless devices and the access point, bandwidth allocation between multiple wireless devices simultaneously communicating with the access point, and various other definitions.

Depending on the air interface protocol and the particular implementation used by a WWAN, a fixed bandwidth might be available for allocation among wireless devices accessing the WWAN. For example, the total fixed bandwidth might be subdivided into carriers, which can then be allocated among the wireless devices. In allocating the carriers, each wireless device might receive the same allocation of carriers and therefore be allocated roughly the same bandwidth for sending and receiving data on the WWAN. Alternatively, the WWAN might use different carrier allocations for different wireless devices, thereby providing the wireless devices with different bandwidths for transmitting and receiving data. While each wireless device might receive the same or different allocation of carriers, a wireless device's usage of the WWAN might vary, thereby providing inefficiencies in the carrier allocations.

For example, at times a wireless device might transmit or receive small amounts of data, while at other times the wireless device might transmit or receive large bursts of data. If the wireless device were allocated a small amount of bandwidth, then the wireless device might not be able to quickly transmit or receive the large bursts of data, thereby resulting in seemingly slow performance. However, if the wireless device were allocated a large amount of bandwidth, the wireless device would seemingly be able to quickly transmit or receive the large bursts of data. At other times when the wireless device was only transmitting or receiving relatively smaller amounts of data, it would not then be using the full amount of bandwidth it was allocated and during high volume times might be depriving other devices of bandwidth that they might otherwise use to transmit and receive data on the WWAN.

Moreover, different implementations of a particular air interface protocol may limit a wireless device's ability to access the WWAN. For example, code division multiple access ("CDMA") is one common air interface protocol. However, various different versions of CDMA (e.g., IS-2000 and IS-856) exist, and due to different methods for allocating bandwidth, providing control information, physically sending information over the air interface, and others, these versions are not necessarily compatible with one another. That is, a wireless device that only supports IS-2000 might not be able to access a WWAN that only supports IS-856 and vice versa.

As service providers develop and implement new versions of underlying air interface protocols, such as to provide higher data rates or other improved characteristics to their subscribers, the new versions might require upgrades to their customer's equipment. For example, if a customer has a wireless device that was compatible with the previous version of the air interface protocol but not compatible with the current version of the air interface protocol, the customer might have to buy a new wireless device in order to continue accessing the WWAN. Customers, however, might not be willing to continually upgrade their wireless devices to accommodate upgrades in the WWAN. This might result in a loss of customers for the service provider, or it might result in the service provider deciding not to implement, or delaying implementing, upgrades to its WWAN that might otherwise provide higher data rates or other advantages for those customers that are willing to upgrade their wireless devices.

Therefore, there exists a need for improved systems and methods of providing access and allocating resources to wireless devices on wireless wide area networks.

SUMMARY OF THE INVENTION

In a wireless wide area network, an access point can communicate with multiple wireless devices according to an air interface protocol. A total bandwidth might be available for communication between the wireless devices and the access point. The total bandwidth can be subdivided into one or more fundamental carriers and a reserved portion, which can be dynamically allocated to the wireless devices as needed.

In various embodiments, the fundamental carriers may be established to enable the use of different versions of the air interface protocol. For example, in one embodiment, one carrier can operate according to the IS-2000 standard for code division multiple access communications, while another carrier can operate according to the IS-856 standard for code division multiple access communications.

In one exemplary operation, a wireless device can be assigned a fundamental carrier for communication on the WWAN. The wireless device may additionally be allocated part or all of the reserved portion, such as when the wireless device needs an increased data rate. The additional allocation might be initiated by the wireless device, such as when the wireless device has a large burst of data to transmit to the access point, or alternatively the additional allocation might be initiated by the access point, such as when the access point has a large burst of data to transmit to the wireless device.

The specific amount of the reserved bandwidth that is allocated to the wireless device can be determined in a variety of different ways. In one embodiment, the access point determines a desired data rate for the wireless device and then allocates an amount of the reserved bandwidth so as to provide the wireless device with the effective data rate. Other embodiments might use different methods for determining the amount of additional bandwidth to allocate to a wireless device.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Introduction

An access point in a WWAN can communicate with wireless devices over a total bandwidth, which can be subdivided into one or more fundamental carriers and a reserved portion that can be dynamically allocated to wireless devices as needed. The fundamental carriers may include a control portion for carrying control and overhead information and a traffic portion for carrying voice and/or data. Thus, the wireless device might communicate on the WWAN using only the fundamental carriers and without needing any portion of the reserved bandwidth.

In various embodiments, the fundamental carriers can operate according to different versions of an air interface standard. For example, in a code division multiple access network, one of the fundamental carriers can operate according to the IS-2000 standard and another of the carriers can operate according to the IS-856 standard. The configuration of the fundamental carriers in this manner can allow the WWAN to support multiple versions of a standard that are otherwise not inherently compatible with each other.

The reserved portion of the total bandwidth can be allocated to wireless devices on an as needed basis. For example, when a wireless device needs to send or receive a large burst of data, the access point can allocate part or all of the additional bandwidth to the wireless device. When the wireless device has a large burst of data to transmit to the access point, the wireless device can request additional bandwidth, and when the access point has a large burst of data to transmit to the wireless device, the access point can initiate the additional allocation of bandwidth to the wireless device.

The amount of the reserved bandwidth to allocate to the wireless device can be determined in a variety of different ways. In one embodiment, the access point can determine a desired data rate for the wireless device and can then allocate an amount of the reserved bandwidth so as to provide the wireless device with the desired data rate. Once the wireless device is allocated the additional bandwidth, the wireless device and the access point can communicate via the fundamental carrier and also via the additional allocated bandwidth.

After the wireless device has sent or received the large burst of data, the additional allocated bandwidth can be released so that it is then available for subsequent allocation to another wireless device. However, the wireless device can continue to communicate on the WWAN via its assigned fundamental channel.

2. Exemplary Architecture

Figure 1:
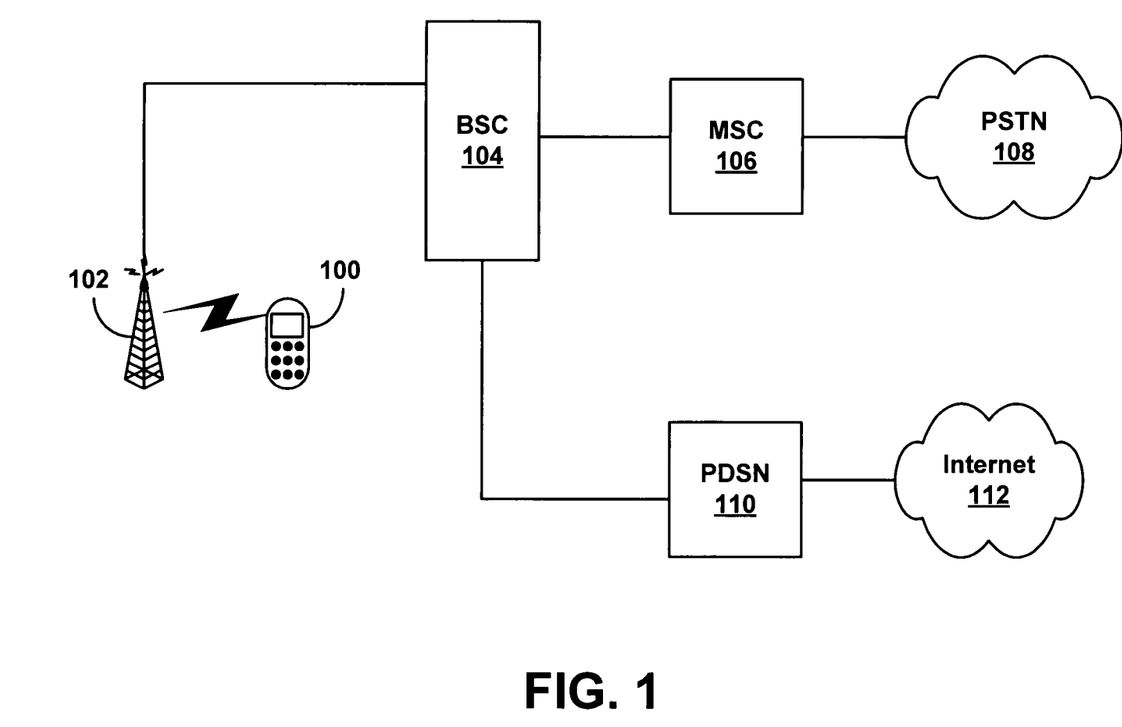
FIG. 1 illustrates an exemplary architecture of a wireless wide area network that supports scalable bandwidth allocation.

FIG. 1 illustrates an exemplary architecture of a wireless wide area network that supports scalable bandwidth allocation. A wireless device 100 can access the WWAN for voice and/or data services. The wireless device 100 may be a mobile phone, a personal digital assistant ("PDA"), a wirelessly equipped computer, a two-way radio or another type of wireless device. While FIG. 1 depicts one wireless device 100 accessing the WWAN for voice and/or data services, the WWAN may alternatively simultaneously provide service to a plurality of different wireless devices. Additionally, while the discussion herein refers to WWANs, it should be understood that wireless networks other than WWANs might alternatively be used.

As shown in FIG. 1, the wireless device 100 communicates with an access point for the WWAN, such as a base station 102, through an air interface. The wireless device 100 can communicate with the base station 102 using a variety of different air interface protocols. In an exemplary embodiment, the wireless device 100 communicates with the base station 102 using CDMA. CDMA provides a method for sending wireless signals between the wireless device 100 and the base station 102. In a CDMA system, the base station 102 communicates with the wireless device 100 over a spread spectrum of frequencies.

In a CDMA system, multiple wireless devices may use the same frequency range, and the multiple wireless devices may each simultaneously communicate with the base station 102 using the same frequency range. A wireless device in a CDMA system spreads its signal across the frequency range. Spreading the signal across a wide bandwidth can reduce interference between signals from different wireless devices. In order to perform signal spreading, each wireless device may be assigned a unique code, such as a Walsh code, to be used for modulating communications. The code may be a sequence of bits, such as a 64 bit binary number; however, other lengths may also be used. This can allow individual signals to be differentiated from other signals, and, therefore, accurately recovered.

In a conventional or "legacy" CDMA wireless network compliant with industry standards TIA/EIA/IS-95 and TIA/EIA/IS-2000, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes." When wireless device operates in a given sector, communications between the mobile station and the BTS of the sector are carried on a given frequency and are encoded by the sector's PN offset and a given Walsh code.

Air interface communications are divided into forward link communications, which are those passing from the access point to the wireless device, and reverse link communications, which are those passing from the wireless device to the access point. In an IS-95 or IS-2000 system, both the forward link and reverse link communications in a given sector are encoded by the sector's PN offset and a given Walsh code.

On the forward link, certain Walsh codes are reserved for use to define control channels, including a pilot channel, a sync channel, and one or more paging channels, and the remainder can be assigned dynamically for use a traffic channels, i.e., to carry user communications. Similarly, on the reverse link, one or more Walsh codes may be reserved to define access channels, and the remainder can be assigned dynamically for use as traffic channels. Further, various forward link channels share the forward link power that is available in the sector. Therefore, when more wireless devices are operating in a sector, the forward link power allocated for transmissions to each wireless device will typically be lower than when fewer wireless devices are operating in the sector.

To engage in packet-data communications in a legacy network, a wireless device first sends a packet-data origination request over the access channel to the network. A base station controller ("BSC") 104 then assigns a traffic channel for use by the wireless device, and the packet data serving node ("PDSN") 110 and the wireless device negotiate with each other to establish a data link layer connection, which can include assigning an IP address to the wireless device. Once the wireless device has a radio link (an assigned traffic channel), a data link, an IP address, the wireless device is considered to be in an "active" mode and can engage in packet-data communications.

Under IS-2000, the highest rate of packet-data communications theoretically available on a fundamental traffic channel of the forward link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carriers a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel, which the wireless device uses to request a specific data rate and sector for communication. The end result is that a mobile station operating under IS-856 can, in theory, receive packet-data at a rate of at least 38.4 kbps and up to 2.4 Mbps.

The IS-856 forward link in each sector is divided into time slots of length 2,048 chips, and each time slot is further time division multiplexed to carry various channels, include a pilot channel, a Medium Access Control (MAC) channel, and, if any traffic exists, a forward traffic channel and a "control" channel. More particularly, each 2,048 chip time slot is divided into two half slots of 1,024 chips each. And each half slot is in turn divided into (i) a 400 chip data channel, (ii) a 64 chip MAC channel, (iii) a 96 chip pilot channel, (iv) another 64 chip MAC channel, and (v) another 400 chip data channel.

The IS-856 data channel includes a traffic channel and a control channel. The traffic channel transmits to a single wireless device at a time and thus includes a preamble sequence that indicates the start of the packet and the intended receiving terminal. The control channel transmits both broadcast messages and terminal-directed messages. A slot during which no traffic or control data is transmitted is referred to as an "idle slot" and would not include the data channels. A slot during which traffic or control data is transmitted, on the other hand, is referred to as an "active slot" and would include the data channels.

As in IS-2000, each sector in IS-856 is defined by a PN offset, and the pilot channel carries an indication of the sector's PN offset, distinguished by increments of 64 chips. An IS-856 mobile station uses the pilot for initial acquisition, phase recovery, timing recovery, and symbol combining. The IS-856 pilot is additionally used to provide an estimate of channel data rate, for purpose of rate adaptation.

Each IS-856 sector has a normal power level (e.g., 16 Watts) at which the sector transmits on the pilot channel, on the MAC channel, and, in an active slot, on the data channel. In the data channel on an idle slot, the sector will substantially reduce its output power output (e.g., to 4 Watts), but the sector will continue to transmit at its normal sector power level on the pilot and MAC channels.

Under the control of a given BSC, when multiple sectors transmit on a common frequency, the forward link signaling of the various sectors will be synchronized by the CDMA system time. Thus, all sectors will transmit their data channels (if any) at the same time, all sectors will transmit their MAC channels at the same time, and all sectors will transmit their pilot channels at the same time.

To acquire packet data connectivity under IS-856, after a wireless device first detects an IS-856 carrier frequency, the wireless device sends to its BSC a UATI (Universal Access Terminal Identifier) request, and receives in response a MAC ID (e.g., an International Mobile Station Identifier (IMSI)), which the wireless device can then use to identify itself in subsequent communications with the BSC. The wireless device then sends a connection-request to the BSC, and the BSC responsively invokes a process to authenticate the wireless device and to have the wireless device acquire a data link.

In particular, the BSC sends an access request to an Access Network AAA (ANAAA) server, and the ANAAA server authenticates the wireless device. The BSC then assigns radio resources for the data session, by directing the mobile station to operate on a particular time slot traffic channel on the forward link and a particular Walsh coded traffic channel on the reverse link. Further, the BSC signals to the PDSN, and the PDSN and the wireless device then negotiate to establish a PPP data link. In addition, as in the IS-2000 process, the wireless device can be assigned an IP address.

As in IS-2000, once the wireless device has acquired an IS-856 radio link, a data link, and an IP address, the wireless device is considered to be in an active mode. In the active mode, as noted above, the wireless device is given full use of the sector power in its assigned time slot, i.e., each time the data channel in its time slot occurs, which facilitates higher rate data communication. Further, as in IS-2000, if the wireless device does not send or receive data for a defined period of time, the wireless device enters a dormant mode. In the dormant mode, an IS-856 system maintains the logical state of the wireless device's session (e.g., an IP address, PPP state, and radio link session information), which releasing the wireless device's radio link resources (e.g., the time slot that had been assigned for use by the wireless device). With the maintained session state, the wireless device can quickly re-acquire a radio link so as to send or receive packet data, thereby giving the appearance that the mobile station is "always on."

CDMA is merely one example of a protocol that can be used for communication between the wireless device 100 and the access point 102. As other examples, the wireless device 100 and the access point 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), General Packet Radio Service ("GPRS"), IS-136, Wireless Application Protocol ("WAP"), time division multiple access ("TDMA"), Integrated Digital Enhanced Network ("iDEN"), HomeRF, HiperLAN, multichannel multipoint distribution services ("MMDS") network, a digital enhanced cordless telecommunications ("DECT"), Bluetooth, IEEE 802.16, IEEE 802.20, any of the various protocols under the IEEE 802.11 umbrella and others may also be used.

The base station 102 couples to a base station controller ("BSC") 104, which, in addition to the previously described functions, can additionally manage handoffs of the wireless device 100 as it moves among base stations in the WWAN or to other wireless networks. The BSC 104 in turn connects to a mobile switching center ("MSC") 106. The MSC 106 can manage setup and teardown of connections with the wireless device 100. While the BSC 104 and the MSC 106 are depicted as separate components, it is possible that their functionality may be combined into a single component. The MSC 106 can additionally provide connectivity to the public switched telephone network ("PSTN") 108. Through this connectivity, the wireless device 100 may access the WWAN for voice services and in turn establish a circuit switched connection with another device on the PSTN 108, the WWAN or another network.

While a traditional voice connection with the WWAN might involve establishing a circuit-switched connection between the wireless device 100 and another entity for voice communications, the wireless device 100 might alternatively establish a data connection with the WWAN in order to engage in packet-switched communications with another entity. In addition to interfacing with the MSC 106 and in turn the PDSN 108, the BSC 104 may also interface with a packet data serving node ("PDSN") 110. The PDSN 110 can provide connectivity to a packet-switched network, such as the Internet 112, an intranet or another packet-switched network.

Using this connectivity, the wireless device 100 can establish a data connection with the WWAN and engage in packet-based communications with devices on a packet switched network, such as the Internet 112. For example, the wireless device 100 might use various protocols to engage in data communications with another device. The wireless device 100 might also use packet based voice protocols such as VoIP to engage in voice communications with another device via the wireless device's data connection with the WWAN.

In accessing the WWAN for data services, the wireless device 100 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices.

While the wireless device 100 may communicate with the PDSN 110 through a PPP session, it may communicate with other devices (e.g., a device on the Internet 112) using higher level protocols. For example, the wireless device 100 may use the Transmission Control Protocol ("TCP")/Internet Protocol ("IP") suite. TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data.

3. Exemplary Operation

Figure 2:
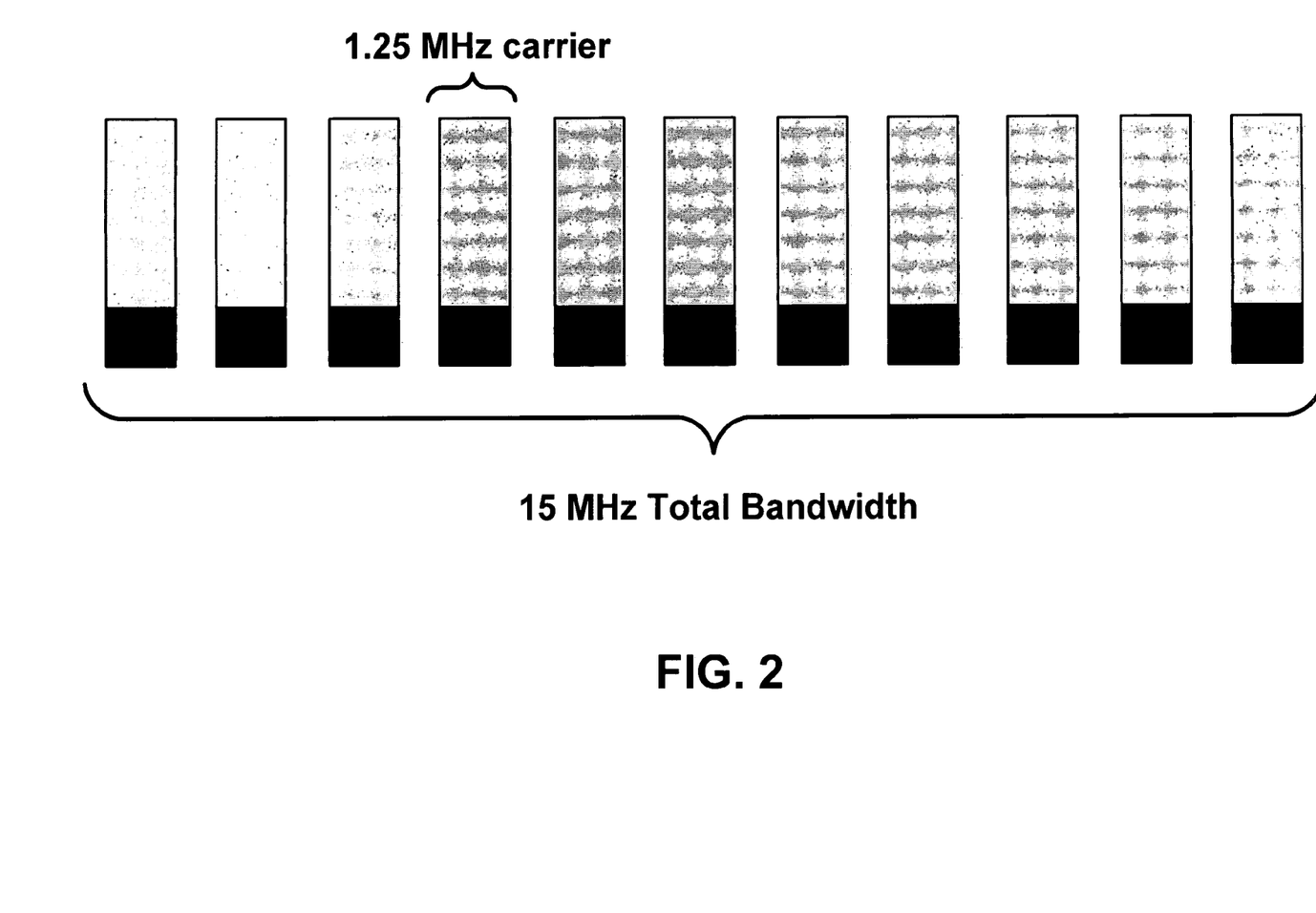
FIG. 2 is a block diagram illustrating an exemplary total bandwidth available in a WWAN for communication between an access point and wireless devices.

FIG. 2 is a block diagram illustrating an exemplary total bandwidth available in a WWAN for communication between an access point and wireless devices. For example, in various CDMA implementations, the access point 102 might be capable of communicating with wireless devices over a 15 MHz total bandwidth. The 15 MHz total bandwidth is merely exemplary in nature, and a greater or smaller total bandwidth might alternatively be available depending on the particular air interface protocol, the implementation of the air interface protocol used by the WWAN, the design and features of the access point, and other factors.

As illustrated in FIG. 2, the 15 MHz total bandwidth might be divided into eleven different 1.25 MHz carriers, which might be assigned to one or more wireless devices for communication between the wireless devices and the access point. These particular divisions, however, are merely exemplary in nature. A greater or fewer number of divisions might alternatively be used, and divisions other than 1.25 MHz might also be used.

As illustrated, each 1.25 MHz carrier generally includes a control portion (i.e., the smaller black shaded region at the bottom of each 1.25 MHz carrier) for carrying control information and other overhead associated with the 1.25 MHz carrier. The remainder of the 1.25 MHz carrier (i.e., the larger gray shaded region at the top of each 1.25 MHz carrier) is a traffic portion that can be allocated to wireless devices to carry voice and/or data. The particular method in which the 1.25 MHz carriers are allocated among wireless devices will typically vary with the WWAN implementation. For example, the air interface protocols might use time division multiplexing to allocate time slots of a particular 1.25 MHz carrier among wireless devices. In another example, the air interface protocol might use code division multiplexing to allocate a particular 1.25 MHz carrier among wireless devices. Other methods are possible depending on the air interface protocol and its particular implementation.

Additionally, a service provider typically pays a vendor to activate carriers employed by an access point. Therefore, although an access point might be capable of communicating across the entire 15 MHz bandwidth using all eleven of the carriers, not all of the carriers are necessarily activated. Therefore, a particular access point might use all of the carriers or might only use a subset of the carriers. Likewise, a wireless device might be capable of communicating across the entire 15 MHz bandwidth but in practice use only those carriers or the portion of the bandwidth that is activated and that is used by the access point.

Figure 3:
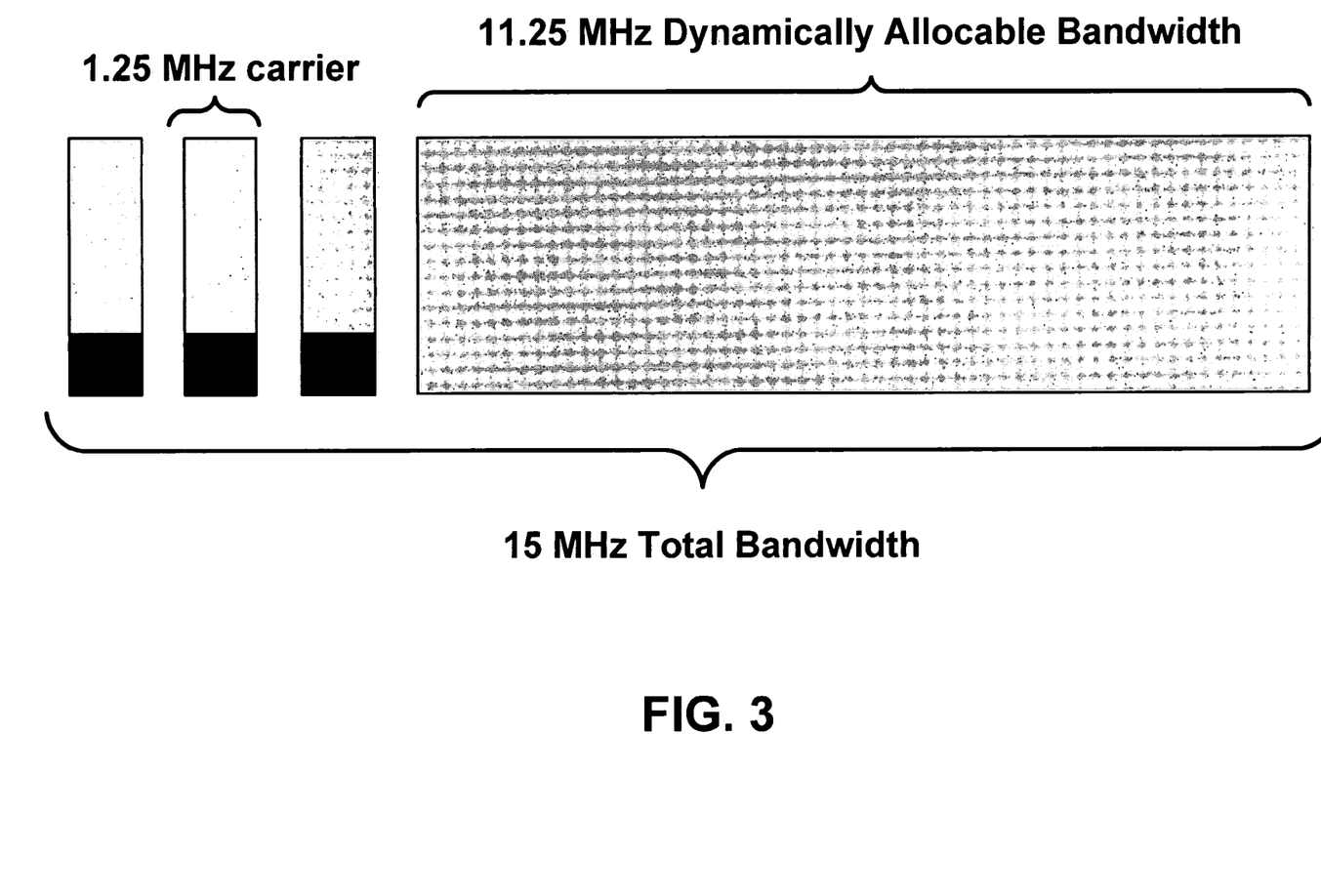
FIG. 3 is a block diagram illustrating an exemplary division of a total bandwidth that supports scalable bandwidth allocation.

FIG. 3 is a block diagram illustrating an exemplary division of a total bandwidth that supports scalable bandwidth allocation. As illustrated, three 1.25 MHz carriers are reserved for allocation to wireless devices. These three 1.25 MHz carriers include the control portion as well as the traffic portion. The three 1.25 MHz carriers might all be part of the same air interface protocol implementation (e.g., IS-2000, IS-95, IS-856 or others) or alternatively might be part of different air interface protocol implementations. For example, one carrier might be part of a first air interface protocol implementation (e.g., IS-2000) while one of the other carriers might be part of a different air interface implementation (e.g., IS-856). As will be described later, the three 1.25 MHz carriers and 11.25 remaining bandwidth are merely exemplary in nature. Other divisions of carriers and remaining bandwidth are also possible.

Returning to the example shown in FIG. 3, the remainder of the 15 MHz total bandwidth might then be allocated among wireless devices as needed, for example, to support a desired data rate. For example, a wireless device might be assigned one of the 1.25 MHz carriers as a fundamental communication channel for communicating on the WWAN. The control portion of the assigned 1.25 MHz carrier includes the control information and other overhead the wireless device needs to access the WWAN. The wireless device can then exchange voice and/or data with the access point over the traffic portion of the 1.25 MHz carrier. Thus, the wireless device can use a single 1.25 MHz carrier to access the WWAN.

However, this fixed allocation of the 1.25 MHz carrier limits the maximum rate at which the wireless device can send or receive data on the WWAN. For example, if the wireless device is allocated certain timeslots of the 1.25 MHz carrier, then given the timeslots and the bandwidth of the carrier, the wireless device is theoretically limited to sending and receiving at a predetermined data rate. However, at times the wireless device might need to send or receive large bursts of data. If the wireless device were limited to only transmitting on the 1.25 MHz carrier, then it might take a relatively long time to transmit the bursts, thereby providing an appearance of a slow network to the user of the wireless device. In order to provide a higher data rate, the wireless device might be dynamically allocated part or all of the remaining 11.25 MHz bandwidth.

For example, when the wireless device needs to send a large burst of data, the wireless device might so notify the access point. This might be done, for example, by notifying the access point of a desired data rate, the amount of data to be transmitted, or some other indication. The notification is preferably sent over the control portion of the 1.25 MHz carrier, but alternatively might be sent over the traffic portion of the 1.25 MHz carrier or even by another method. Alternatively, the wireless device might simply send an indication that it has a burst of data to transmit but without providing a desired data rate, the amount of the data to be transmitted or other such information associated with the burst of data. Additionally, while the discussion herein refers to a burst of data, this might include a large amount of data to be transmitted over a relatively short period of time but might also include a large amount of data to be transmitted over an extended period of time.

After receiving the notification from the wireless device, the access point can dynamically allocate the wireless device additional bandwidth from the 11.25 MHz bandwidth that remains separate from the 1.25 MHz carriers. The amount of bandwidth allocated to the wireless device can depend on a variety of different factors. For example, it might depend on the amount of that 11.25 MHz bandwidth that is already allocated to wireless device and therefore how much remains available to be allocated. It might also depend on the desired bandwidth indicated by the wireless device, the amount of data to be transmitted, the particular subscriber plan associated with the wireless device, or other factors.

In one embodiment, the access point determines a desired data rate for the wireless device. This might be the desired data rate indicated by the wireless device, or it might be that desired data rate indicated by the wireless device but modified by various other factors (e.g., the amount of bandwidth available to allocate to the wireless device, the number of other wireless devices accessing the WWAN, the subscriber plan associated with the wireless device, the time of day, or other factors). Once the access point determines the desired data rate, the wireless device can then determine how much additional bandwidth should be allocated to the wireless device in order to achieve that data rate.

Similarly, the access point can allocate additional bandwidth to the wireless device when the access point determines that there is a large burst of data to transmit to the wireless device. For example, the access point might consider one or more of the previously described factors to determine how much additional bandwidth to allocate to the wireless device. And, once the access point determines that it should allocate additional bandwidth to the wireless device, the access point can so inform the wireless device.

Regardless of whether the wireless device or the access point initiates the additional bandwidth allocation, the access point and the wireless device can then communicate to establish communication on the additional bandwidth allocated to the wireless device. For example, the access point can communicate with the wireless device over the control portion of the 1.25 MHz carrier to establish communication on additional bandwidth in the separate 11.25 MHz portion. The access point might alternatively communicate with the wireless device over the traffic portion of the 1.25 MHz carrier or in some other manner to establish communication on the additional bandwidth. Once the wireless device is dynamically allocated the additional bandwidth, the wireless device can then use the additional bandwidth to send and receive traffic over the WWAN.

When the wireless device no longer needs the additional bandwidth, it can then relinquish that bandwidth. This can allow the access point to reallocate that bandwidth to another device so as to optimize use of the total available bandwidth of the access point. For example, once the wireless device transmits its large burst of data (and if it does not have another large burst of data to transmit or some other need for the additional allocated bandwidth), it can notify the access point that it no longer needs the additional bandwidth. As with establishing the additional bandwidth, this might be done via the control portion of the 1.25 MHz carrier; however, this notification might be done via other mechanisms as well. Alternatively, if the wireless device only needs some of the additional bandwidth but not all of the additional bandwidth, the wireless device can notify the access point that it is releasing only a portion of the additional bandwidth that was originally allocated to the wireless device.

In another embodiment, the access point might notify the wireless device to release some or all of the additional bandwidth. For example, the access point might allocate the additional bandwidth for a predetermined amount of time (e.g., enough time for the wireless device to transmit or receive the large burst of data). In another example, the access point might determine that the wireless device is no longer sending or receiving enough data or the additional bandwidth. In yet another example, the access point might determine that the additional bandwidth needs to be allocated to other wireless device on the WWAN, such as when the WWAN is operating close to peak capacity. Once the access point determines that one of these conditions exists, or that some other threshold has been met, the access point can responsively notify the wireless device to release some or all of this additional bandwidth. The signaling to release the additional bandwidth might be done over the control portion of the 1.25 MHz carrier, the traffic portion of the 1.25 MHz carrier, over the additional bandwidth or by some other mechanism.

Figure 4:
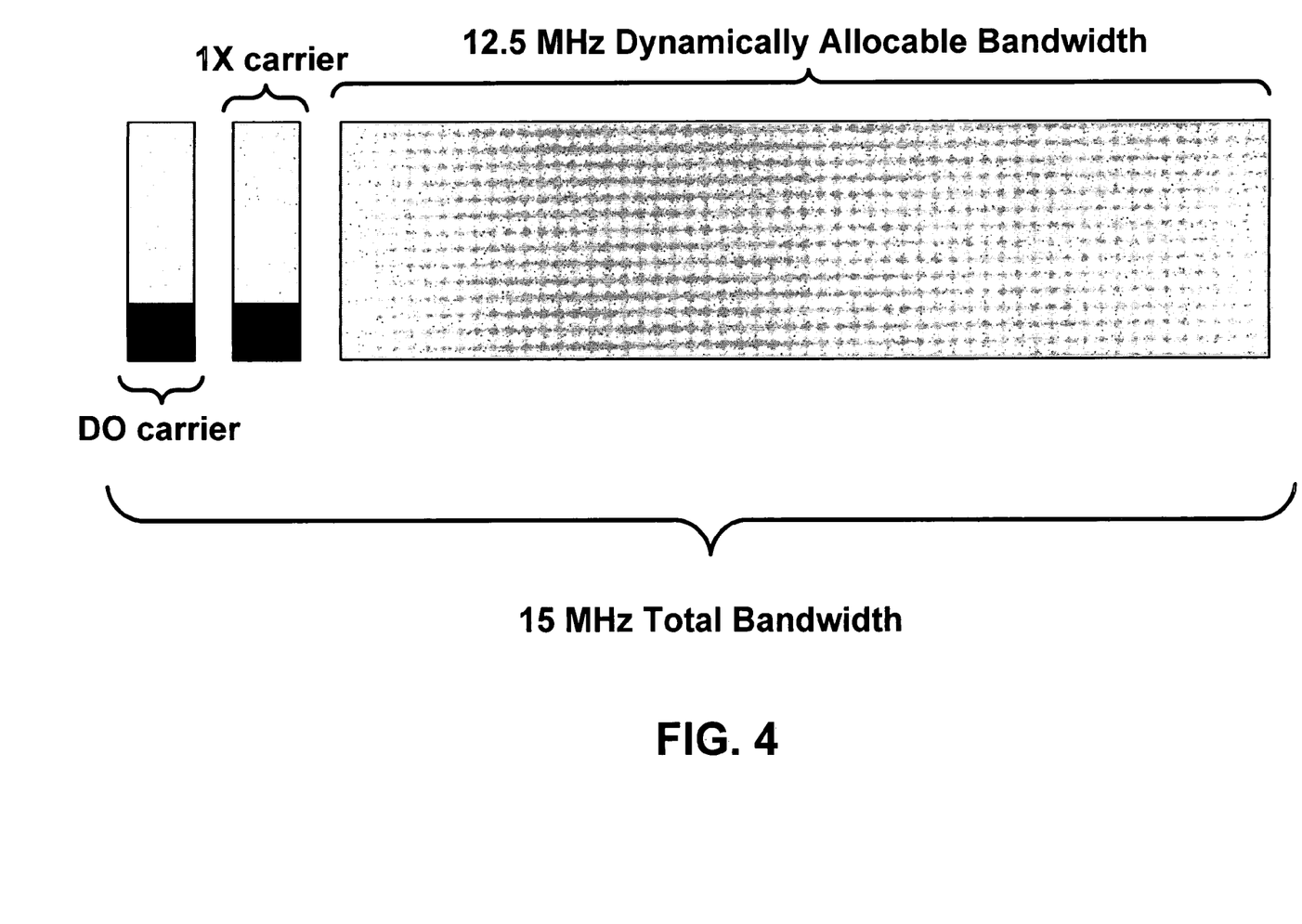
FIG. 4 is a block diagram of an exemplary division of a total bandwidth that supports both scalable bandwidth allocation and enables both DO and 1X communications in a CDMA network.

FIG. 4 is a block diagram of an exemplary division of a total bandwidth that supports both scalable bandwidth allocation and enables both DO and 1X communications in a CDMA network. CDMA 2000 1X ("1X") and CDMA 2000 1X EV-DO ("DO") are two well known versions of CDMA, although these are merely exemplary in nature and others might also be used. As illustrated, two 1.25 MHz carriers are reserved to support DO and 1X communications. The first 1.25 MHz carrier includes the control information and other overhead, as well as a traffic portion, for supporting DO communications. The second 1.25 MHz carrier includes the control information and other overhead, as well as a traffic portion, for supporting 1X communications. Thus, devices adhering to either the DO or 1X variations of CDMA can access the WWAN.

In this way, the WWAN provides compatibility between these two different CDMA versions that are not otherwise compatible. It should be understood, however, that the DO and 1X standards are merely exemplary in nature, and other variations might alternatively be used. For example, in one generic usage, these principles of bandwidth allocation can be used to upgrade a currently implemented air interface standard so as to provide backward compatibility on the WWAN even if the upgraded air interface standard is itself not backward compatible with the currently implemented air interface standard.

Returning to FIG. 4, the remaining 12.5 MHz bandwidth can be allocated among wireless devices as needed, such as to support a particular data rate for the device. The use of the two 1.25 MHz carriers and the dynamic nature in which the 12.5 MHz bandwidth is allocated significantly reduces or eliminates the need for additional control information and overhead to be carried in the 12.5 MHz bandwidth. That is, the control information and overhead depicted in FIG. 2 is replicated across the entire 15 MHz bandwidth, because the control information and overhead is a part of each individual carrier. In the bandwidth allocation of FIG. 4, however, the control information and overhead is significantly reduced or eliminated in the 12.5 MHz bandwidth, thereby allowing more of that bandwidth to be used for the transmission of data.

Figure 5:
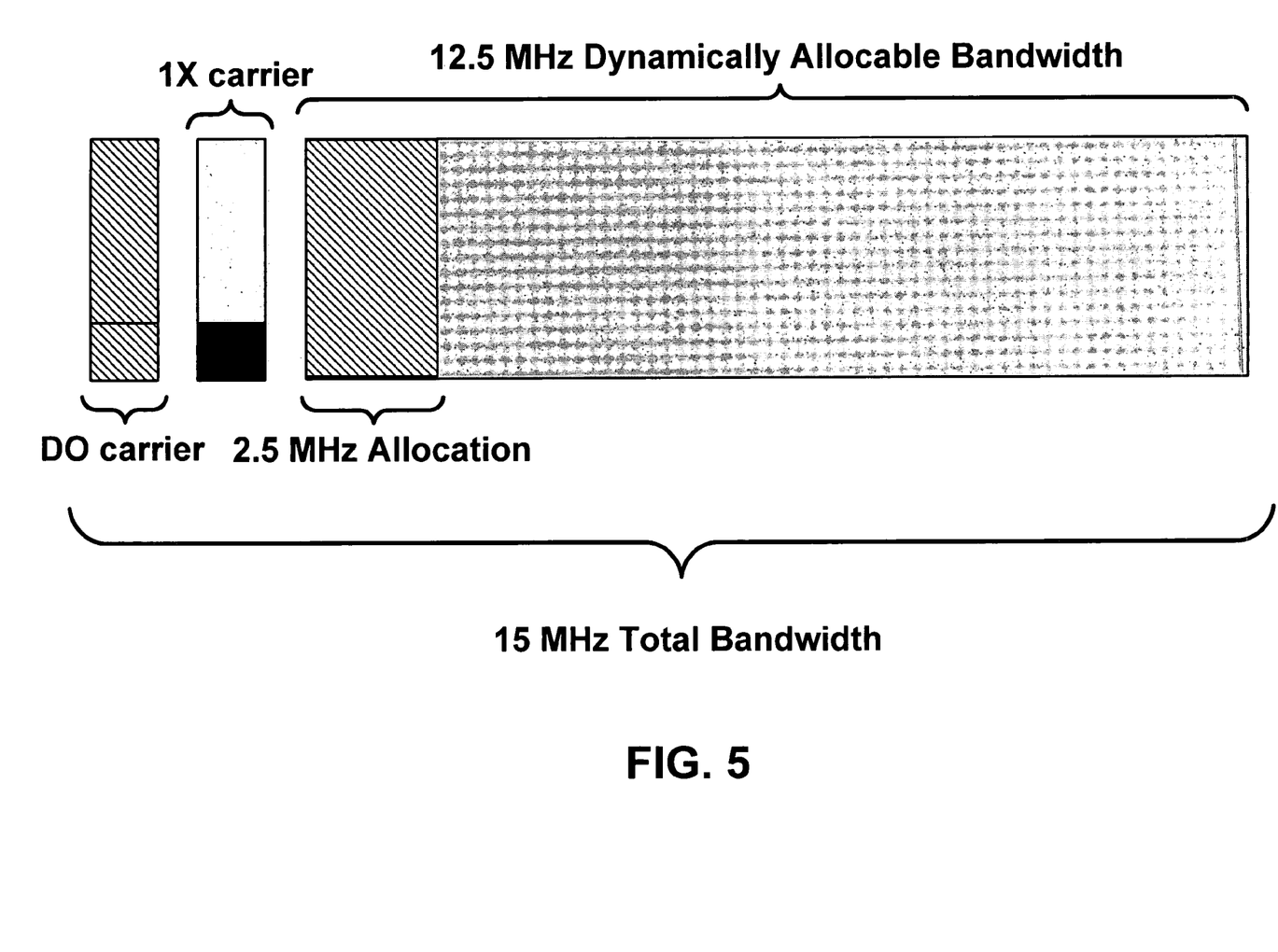
FIG. 5 is a block diagram of an exemplary allocation of bandwidth to a wireless device in a CDMA network that both supports scalable bandwidth allocation and enables both DO and 1X communications.

FIG. 5 is a block diagram of an exemplary allocation of bandwidth to a wireless device in a CDMA network that both supports scalable bandwidth allocation and enables both DO and 1X communications. The hashed lines illustrate the allocation of both a carrier and additional bandwidth to a wireless device. As illustrated, the wireless device is allocated the DO carrier, which might be time division multiplexed in order to be allocated among other wireless devices as well. In addition, the wireless device is allocated 2.5 MHz of the 12.5 MHz dynamically allocable bandwidth.

Since the wireless device operates according to the DO standard, the 2.5 MHz portion that is allocated to the wireless device might also be time division multiplexed among other wireless devices. In various implementations, the wireless device might have use of this 2.5 MHz of bandwidth contemporaneously with its use of the 1.25 MHz carrier. However, in other embodiments, the time slots in which the wireless device is permitted to use the 2.5 MHz of bandwidth do not necessarily coincide with its time slots in which the wireless device is permitted to use the 1.25 MHz carrier. Additionally, the particular methods for allocating the 2.5 MHz bandwidth might vary depending on the capabilities of the device (e.g., whether the device adheres to the DO or 1X standards) as well as the particular implementation of the dynamic bandwidth allocation used by the WWAN.

The 2.5 MHz of additional bandwidth is merely exemplary in nature. The wireless device might be allocated a greater or smaller amount of additional bandwidth as necessary. In various embodiments, the additional bandwidth might be divided into virtual 1.25 MHz portions, and in this case the wireless device would be allocated two of those portions. The wireless device might transmit on the two 1.25 MHz portions of the additional bandwidth separately, as if the wireless device was assigned two additional independent 1.25 MHz carriers. Alternatively, the wireless device might transmit across the entire 2.5 MHz as if it was assigned one additional 2.5 MHz carrier.

In other embodiments, however, the additional bandwidth need not be divided into virtual carriers. Thus, the wireless device might be allocated an arbitrary amount of the 12.5 MHz bandwidth, and the amount of additional bandwidth that the wireless device is allocated need not be an integer multiple of the 1.25 MHz carrier. Additionally, while this figure illustrates the wireless device being allocated a continuous portion of the 12.5 MHz additional bandwidth, the wireless device might alternatively be allocated two or more separate portions of the 12.5 MHz additional bandwidth.

Figure 6:
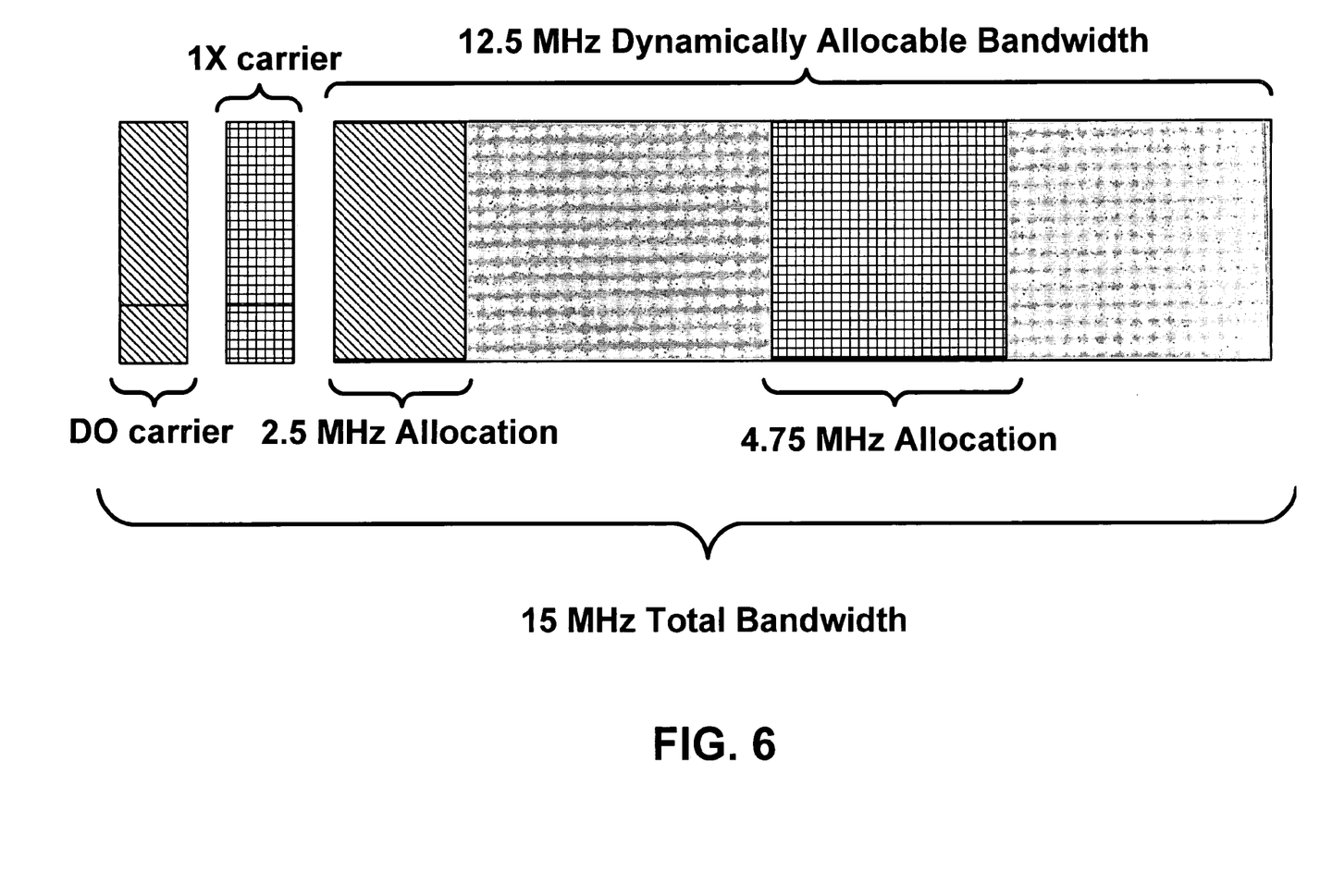
FIG. 6 is a block diagram of an exemplary allocation of bandwidth to two wireless devices in a CDMA network that supports both scalable bandwidth allocation and enables both DO and 1X communications.

FIG. 6 is a block diagram of an exemplary allocation of bandwidth to two wireless devices in a CDMA network that supports both scalable bandwidth allocation and enables both DO and 1X communications. As illustrated in this figure and also in the previous figure, a wireless device that operates according to the DO standard is allocated a 1.25 MHz DO carrier as well as an addition 2.5 MHz of bandwidth. At the same time, a wireless device that operates according to the 1X standard is allocated a 1.25 MHz 1X carrier as well as a 4.75 MHz portion of the 12.5 MHz dynamically allocable bandwidth. The 4.75 MHz portion of the 12.5 MHz dynamically allocable bandwidth might be simultaneously allocated to other device using different Walsh codes in accordance with the 1x standard.

Figure 7:
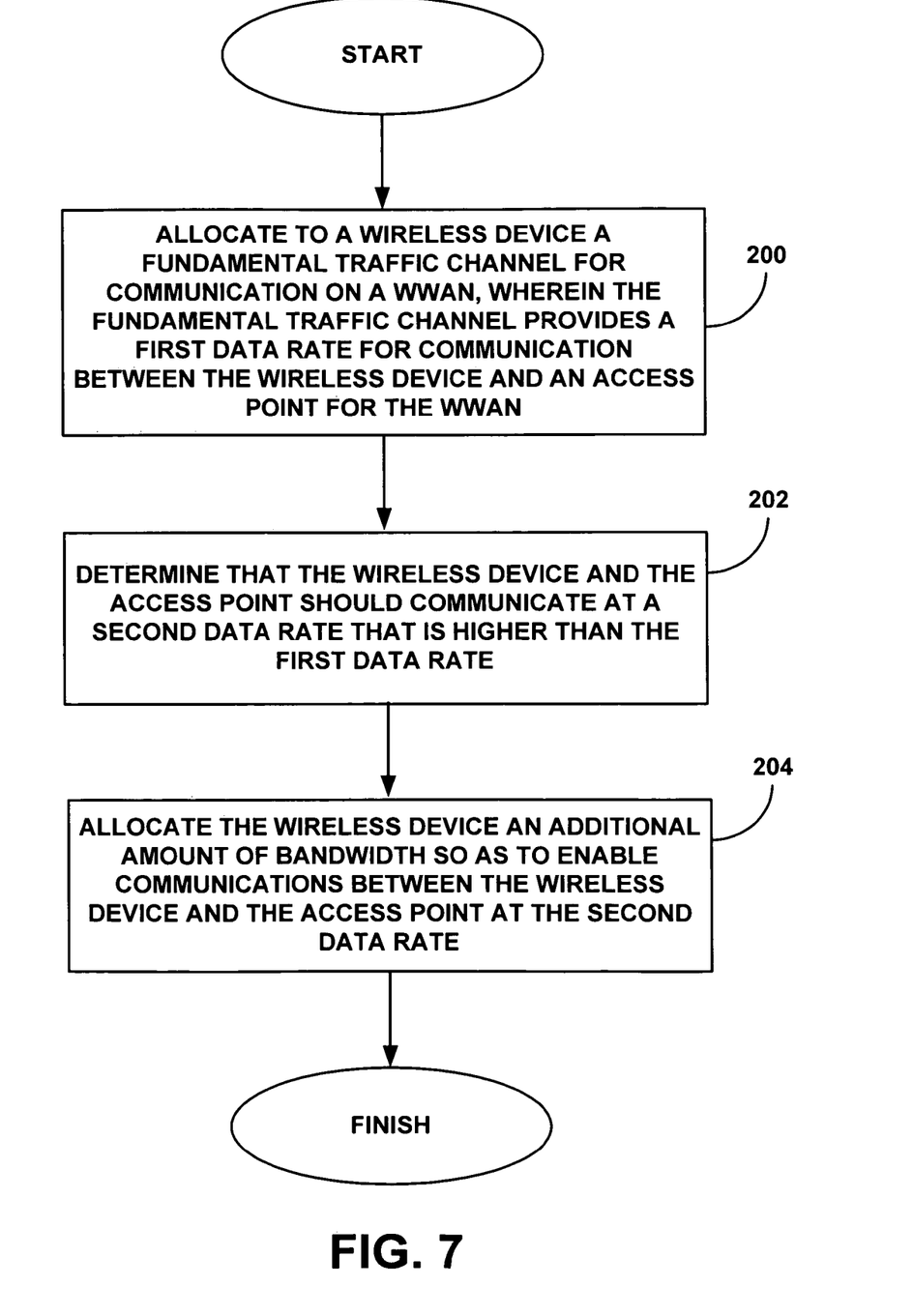
FIG. 7 is a flowchart of an exemplary method for allocating bandwidth.

FIG. 7 is a flowchart of an exemplary method for allocating bandwidth. The method might be performed, for example, by an access point for the WWAN. At Step 200, the access point allocates to a wireless device a fundamental traffic channel for communication on a WWAN, wherein the fundamental traffic channel provides a first data rate for communication between the wireless device and an access point for the WWAN. For example, the wireless device might be allocated either the DO carrier or 1X carrier illustrated in the preceding figures. This allocation, depending on WWAN factors, generally correlates to a maximum data rate.

At Step 202, the access point determines that the wireless device and the access point should communicate at a second data rate that is higher than the first data rate. That is, the access point might determine that the wireless device and the access point should communicate at a data rate that is higher than that supported by the fundamental traffic channel. At Step 204, the access point allocates the wireless device an additional amount of bandwidth so as to enable communications between the wireless device and the access point at the second data rate.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for allocating bandwidth, the method comprising:
    allocating to a wireless device a fundamental carrier channel for communication on a wireless wide area network (WWAN), wherein the fundamental carrier channel provides a first data rate for communication between the wireless device and an access point of the WWAN;
    determining that the wireless device and the access point should communicate at a second data rate, wherein the second data rate is higher than the first data rate; and
    allocating the wireless device an additional amount of bandwidth so as to enable communications between the wireless device and the access point at the second data rate, wherein the fundamental carrier channel is in a first frequency range and the additional amount of bandwidth is in a second frequency range separate from the first frequency range such that the additional amount of bandwidth is not adjacent to the fundamental carrier channel, and wherein the additional amount of bandwidth has a frequency bandwidth that is at least twice that of the fundamental carrier channel.

2. The method of claim 1, wherein determining that the wireless device and the access point should communicate at the second data rate comprises receiving from the wireless device an indication to communicate at the second data rate.

3. The method of claim 2, further comprising:
    receiving from the wireless device an indication to reestablish communication between the wireless device and the access point at the first data rate; and
    responsively unallocating the additional amount of bandwidth.

4. The method of claim 1, wherein determining that the wireless device and the access point should communicate at the second data rate comprises the access point determining that it has a burst of data to transmit to the wireless device.

5. The method of claim 4, further comprising:
    sending the burst of data to the wireless device; and
    unallocating the additional amount of bandwidth to the wireless device, such that the access point and the wireless device resume communications at the first data rate.

6. The method of claim 1, wherein the additional amount of bandwidth is a sub-portion of a range of bandwidth that is dynamically allocable to wireless devices.

7. The method of claim 6, wherein the range of bandwidth is allocable among wireless devices on the WWAN that use inherently incompatible versions of an air interface protocol.

8. The method of claim 1, wherein the fundamental carrier channel includes a control portion and a data portion, wherein the additional bandwidth includes only a data portion, and wherein control information associated with the additional bandwidth is carried over the control portion of the fundamental carrier channel.

9. The method of claim 1, wherein the first carrier channel has a frequency bandwidth of 1.25 MHz.

10. The method of claim 9, wherein the additional amount of bandwidth has a frequency bandwidth of 2.5 MHz.

11. A method for allocating bandwidth in a wireless wide area network, the method comprising:
    allocating a first carrier channel to a first wireless device, wherein the first carrier channel operates according to a first version of an air interface protocol;
    allocating a second carrier channel to a second wireless device, wherein the second carrier channel operates according to a second version of an air interface protocol, and wherein the second version of the air interface protocol is not compatible with the first version of the air interface protocol;
    dynamically allocating a first sub-portion of a reserved bandwidth to the first wireless device, wherein the reserved bandwidth is separate from the first and second carrier channels; and
    dynamically allocating a second sub-portion of the reserved bandwidth to the second wireless device, wherein the first and second sub-portions are in separate frequency ranges such that the first sub-portion is not adjacent to the first carrier channel and the second sub-portion is not adjacent to the second carrier channel, and wherein the first sub-portion has a greater frequency bandwidth than that of the first carrier channel and the second sub-portion has a greater frequency bandwidth than that of the second carrier channel.

12. The method of claim 11, wherein the air interface protocol is code division multiple access, wherein the first version is IS-2000, and wherein the second version is IS-856.

13. The method of claim 11, wherein dynamically allocating a first sub-portion of a reserved bandwidth to the first wireless device comprises:
    receiving from the first wireless device an indication of a preferred data rate; and
    allocating the first wireless device the first sub-portion of the reserved bandwidth so as to enable communications between the first wireless device and the access point at the preferred data rate.

14. The method of claim 11, wherein dynamically allocating a first sub-portion of a reserved bandwidth to the first wireless device comprises:
    receiving from the first wireless device an indication that it has a burst of data to transmit to the access point; and
    allocating the first wireless device the first sub-portion of the reserved bandwidth so as to enable communications between the first wireless device and the access point at a higher data rate.

15. The method of claim 11, wherein dynamically allocating a first sub-portion of a reserved bandwidth to the first wireless device comprises:
    receiving a burst of data to be transmitted to the first wireless device; and
    responsively allocating the first wireless device the first sub-portion of the reserved bandwidth so as to enable communications between the first wireless device and the access point at a higher data rate.

16. The method of claim 11, wherein the first sub-portion comprises two non-contiguous ranges in the reserved bandwidth.

17. The method of claim 11, wherein a bandwidth of the first sub-portion is not an integer multiple of a bandwidth of the first carrier channel.

18. The method of claim 11, wherein the first carrier channel has a frequency bandwidth of 1.25 MHz.

19. The method of claim 11, wherein the second carrier channel has a frequency bandwidth of 1.25 MHz.

* * * * *